(12) United States Patent
Hofstaetter et al.

(10) Patent No.: US 10,400,692 B2
(45) Date of Patent: Sep. 3, 2019

(54) METHOD AND DEVICE FOR REDUCING THE EMISSIONS OF AN INTERNAL COMBUSTION ENGINE

(71) Applicant: Robert Bosch GmbH, Stuttgart (DE)

(72) Inventors: Jochen Hofstaetter, Sinsheim (DE); Volker Ricken, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/522,118

(22) Filed: Oct. 23, 2014

(65) Prior Publication Data

US 2015/0113955 A1 Apr. 30, 2015

(30) Foreign Application Priority Data

Oct. 24, 2013 (DE) .................. 10 2013 221 595

(51) Int. Cl.
*F02D 41/02* (2006.01)
*F02D 41/06* (2006.01)
*F02D 41/14* (2006.01)

(52) U.S. Cl.
CPC ....... *F02D 41/024* (2013.01); *F02D 41/0255* (2013.01); *F02D 41/062* (2013.01); *F02D 41/1459* (2013.01); *F02D 41/1463* (2013.01); *F02D 41/1475* (2013.01); *F02D 2200/0802* (2013.01); *Y02T 10/26* (2013.01)

(58) Field of Classification Search
CPC ........... F02D 2200/0802; F02D 41/024; F02D 41/0255; F02D 41/062; F02D 41/1459; F02D 41/1463; F02D 41/1475
USPC .................................. 60/277, 284, 285, 299
See application file for complete search history.

(56) References Cited

U.S. PATENT DOCUMENTS

| | | | |
|---|---|---|---|
| 6,453,665 B1* | 9/2002 | Bower, Jr. ........... | F02D 41/1441 60/274 |
| 7,458,203 B2* | 12/2008 | Pott ........................ | B60K 6/48 180/165 |
| 2004/0187481 A1* | 9/2004 | Elwart .................. | F01N 3/0814 60/285 |
| 2009/0301437 A1* | 12/2009 | Mizoguchi .............. | F01N 3/101 123/443 |
| 2012/0210698 A1* | 8/2012 | Winkler ................ | F01N 3/2013 60/274 |

FOREIGN PATENT DOCUMENTS

DE 102011004380 8/2012

* cited by examiner

*Primary Examiner* — Phutthiwat Wongwian
*Assistant Examiner* — Diem T Tran
(74) *Attorney, Agent, or Firm* — Norton Rose Fulbright US LLP; Gerard Messina

(57) ABSTRACT

A method for reducing the pollutant emissions in the exhaust gas in a start/catalytic converter heating phase of an internal combustion engine featuring externally supplied ignition and having at least one catalytic converter in an exhaust gas tract of the internal combustion engine, and for adapting a catalytic converter heating strategy to suitable state variables of the internal combustion engine and the catalytic converter as well as to the fuel quantity, the aging state and ambient conditions. The internal combustion engine is operated in a first phase of the start/catalytic converter heating phase using a lean air-fuel mixture in a range between a lambda value of 1.05 and at a lean misfire limit of the internal combustion engine that lies at a higher lambda value, and/or in a second phase of the start/catalytic converter heating phase, initially using a rich air-fuel mixture.

15 Claims, 2 Drawing Sheets

METHOD AND DEVICE FOR REDUCING THE EMISSIONS OF AN INTERNAL COMBUSTION ENGINE

RELATED APPLICATION INFORMATION

The present application claims priority to and the benefit of German patent application no. 10 2013 221 595.9, which was filed in Germany on Oct. 24, 2013, the disclosure of which is incorporated herein by reference.

FIELD OF THE INVENTION

The present invention relates to a method for reducing the pollutant emissions in the exhaust gas in a start/catalytic converter heating phase of an internal combustion engine featuring externally supplied ignition and having at least one catalytic converter in an exhaust tract of the internal combustion engine, and for adapting a catalytic converter heating strategy to suitable state variables of the internal combustion engine and of the at least one catalytic converter as well as to the fuel quality, aging state and ambient conditions. The present invention furthermore relates to a device for reducing the pollutant emissions in the exhaust gas in a start/catalytic converter heating phase of an internal combustion engine having externally supplied ignition and an engine control assigned to the internal combustion engine as well as at least one catalytic converter in an exhaust tract of the internal combustion engine.

BACKGROUND INFORMATION

Catalytic converters and lambda probes are used in the exhaust gas system of internal combustion engines for optimizing the pollutant emissions and for the exhaust gas aftertreatment. The lambda probes ascertain the oxygen content of the exhaust gas, which is used for regulating the air-fuel mixture supplied to the internal combustion engine and thus for regulating the exhaust gas lambda upstream from a catalytic converter. Via a lambda closed loop control, the air and fuel supply of the internal combustion engine is regulated in such a way that an optimal composition of the exhaust gas is achieved for the exhaust gas aftertreatment by the catalytic converters provided into the exhaust tract of the internal combustion engine. In the case of Otto engines, a lambda of 1, i.e., a stoichiometric air to fuel ratio, is regulated as a rule. However, catalytic converters achieve their purification effect only when heated to a sufficiently high temperature. In Otto engines for low-emission concepts a main share of the emissions is produced in the cold-start phase. As a result, very rapid heating of the catalytic converters following the engine start is required in order to convert the raw emissions as completely and quickly as possible. Moreover, the raw emissions themselves must be as low as possible in the cold start.

To heat the catalytic converters, the internal combustion engine can be operated using a rich mixture and secondary air may be metered in the exhaust gas tract between the outlet valves of the internal combustion engine and the catalytic converter in addition. Hydrocarbons in the exhaust gas are then combusted with the oxygen of the secondary air upstream from or inside the catalytic converter and heat it up. In an alternative heating method, the internal combustion engine may be operated at a reduced efficiency, so that the exhaust gas assumes a relatively high temperature and heats up the catalytic converter. To reduce the efficiency, it is common practice to increase the air quantity in the combustion chambers, to adjust the ignition angle in the retarded direction and to thereby generate a torque reserve. This causes less combustion energy to be converted into kinetic energy and the exhaust gas is expelled from the combustion chamber at a higher temperature. However, depending on the combustion method, this often has the result that a greater quantity of nitrogen oxide is contained in the exhaust gas as the exhaust gas temperature rises or an exhaust gas heat flow increases. In the case of lowest emission concepts, however, stringent limit values for the discharge of hydrocarbons and nitrogen oxides must be observed, so that the reduction of the pollutant emissions in the exhaust gas within the start/catalytic converter heating phase is of the greatest importance.

SUMMARY OF THE INVENTION

Therefore, it is an object of the present invention to provide a method for reducing the emission of hydrocarbons and nitrogen oxides in the start/catalytic converter heating phase of an internal combustion engine having externally supplied ignition.

It is furthermore an object of the present invention to provide a device for implementing the method.

The objective of the present invention with regard to the method may be achieved in that in a first phase of the start/catalytic converter heating phase, the internal combustion engine is operated using a lean air-fuel mixture in a range between a lambda value of 1.05 and a lean misfire limit of the internal combustion engine that lies at a higher lambda value, and/or in that in a second phase of the start/catalytic converter heating phase, it is initially operated using a rich air-fuel mixture having an initial value in a range between a lambda value of 0.95 and a lambda value of 0.995, and during the second phase, the lambda value of the air-fuel mixture is brought from the initial value to a lambda target value. As a result of this heating strategy for the heating of the catalytic converter, which is adapted to the behavior of the internal combustion engine and the catalytic converter, it is possible to reduce the raw emissions of hydrocarbons and nitrogen oxides in the first phase following the start of the internal combustion engine in the start/catalytic converter heating phase. Because of the precontrol or adjustment of a lambda value that is appropriate depending on the combustion method, in a range between 1.05 to 1.25, for example, the raw emissions of the internal combustion engine are reduced when compared with an operation in a lambda range of 1.0 to 1.05. As an upper limit of the lambda value, a drop below the lean misfire limit of the internal combustion engine must take place, which may typically lie at a lambda value of 1.25 depending on the precise operating conditions.

If the catalytic converter has been heated to such a degree that a sufficient conversion of the hydrocarbons and nitrogen oxides takes place, the nitrogen oxide emission is heavily reduced by the rapid switch to a rich air-fuel mixture at the beginning of the second phase, inasmuch as an abruptly increased conversion of the nitrogen oxide raw emissions takes place in the catalytic converter. The interaction between these two phases makes it possible to set a greater exhaust gas heat flow, so that more rapid heating is able to be achieved after the start. Overall, the method achieves a considerable reduction of the undesired emission of hydrocarbons and, in particular, nitrogen oxides. The lambda value to be set in the first phase depends on the combustion method and is adjusted to ensure a reliable ignition and combustion of the mixture. A model of the engine behavior with regard to raw emissions, exhaust gas heat flow and running behavior may be used to specify the mixture stoichiometry, which, in addition to considering suitable engine control signals (e.g., highly resolved engine speed, combustion chamber pressure), also takes effects of the fuel quality and engine aging into account. A smooth-running control is able to safeguard the adjustment of the lambda value permitted depending on the state of the combustion engine, the fuel quality and ambient conditions.

The two method components for the first and second phase may be used both jointly or each one separately by itself. The lean operation in the described development presupposes that the combustion method used in the particular case reliably allows such a lean operation immediately after the start. The use of the rich mixture in the second phase makes it possible to use more retarded ignition angles than in the related art, so that the torque reserve becomes greater and the heating of the exhaust gas is increased.

In one development of the method it is provided that the lambda value is abruptly varied from the lean range to the rich range between the first phase and the second phase; and/or that in the second phase a lambda curve is brought from the initial value to the lambda target value in a ramp-type or some other manner that is adapted to the catalytic converter behavior. Because of the abrupt change in the lambda value from the lean to the rich range, a rapidly increased conversion of the nitrogen oxide raw emissions is achieved. At the same time, hydrocarbons are converted into carbon monoxide and hydrogen at the beginning of the second phase in the already heated catalytic converter. An excessive enrichment while the catalytic converter is still too cold must be avoided in such a case, since it could lead to an undesired high breakthrough of hydrocarbons. Following the abrupt change to rich, a ramp function that may be linear or suitably curved can be used to guide the lambda value to the target value of generally lambda=1 to be adjusted in a catalytic converter having operating temperature.

A minimal total emission is achieved by ending the first phase when the temperature of the catalytic converter is so high that the conversion of hydrocarbons and nitrogen oxides is higher than the reduction potential of raw emissions when using a lean fuel-air mixture.

In one further development of the method it is provided that the duration of the first phase is ascertained and specified via tests on an engine test stand using a suitably pre-aged catalytic converter, or that the duration of the first phase is ascertained in an engine control of the internal combustion engine from a behavior model of the internal combustion engine and a behavior model of the at least one catalytic converter, or that an output signal from an exhaust gas sensor connected downstream from the catalytic converter, which is sensitive to hydrocarbons and/or nitrogen oxides and/or with regard to the mixture stoichiometry, and/or from an exhaust gas temperature sensor are/is used to ascertain the end of the first phase. In so doing, the behavior model of the internal combustion engine takes into account the raw emissions and the exhaust gas heat flow. In the behavior model of the catalytic converter, its thermal behavior, the exhaust gas conversion behavior as well as its aging state are considered. The start of the conversion is determined via the exhaust gas sensor, which is sensitive with regard to hydrocarbons and/or nitrogen oxides and may be integrated into an existing lambda probe, so that the reversal of the lambda value into the rich range may commence.

An especially suitable lambda characteristic in the second phase is able to be ascertained in that the initial lambda value and/or the characteristic of the transition from the initial lambda value to the lambda target value in the second phase is ascertained and specified via tests on an engine test stand using a suitably pre-aged catalytic converter, or in that it is ascertained in an engine control of the internal combustion engine on the basis of a behavior model for the engine, which considers raw emissions, the exhaust gas heat flow and quiet running, and/or from a behavior model of the catalytic converter, which describes its light-off behavior, its oxygen storage capacity and its pollutant conversion behavior individually or in a combination of the characteristic quantities. In the behavior model of the catalytic converter, its exhaust gas conversion behavior as well as the behavior of the oxygen storage capacity of the catalytic converter are represented. A "light-off behavior" relates to the behavior with respect to the start of the conversion when the temperature is increased.

An adaptation of the lambda characteristic to variable lean misfire limits of the engine, which may be caused by influences such as engine aging, engine tolerances, fuel quality, external temperature, and external air pressure, is achieved in that the setpoint value of the lambda characteristic during the first phase is adapted and/or regulated in the engine control device based on an evaluation of a combustion stability and/or smooth engine running, and/or based on suitable variables of a combustion chamber pressure induction.

The object of the present invention with regard to the device may be achieved in that a switching circuit or a program sequence is provided in the engine control for operating the internal combustion engine in the start/catalytic converter heating phase in a first phase using a lean air-fuel mixture, e.g., in a range between lambda=1.05 and a lean misfire limit of the internal combustion engine that is higher (e.g., lambda=1.25), and/or in a second phase using a rich air-fuel mixture having an initial lambda value in a range between, for example, lambda=0.95 and lambda=0.995 and a transition to a lambda target value. In Otto engines for lowest-emission concepts, the device according to the present invention advantageously makes it possible to heat the catalytic converter very rapidly after the engine start, and to thereby start the conversion of the raw emissions of the engine as rapidly as possible. Furthermore, the expelling of undesired nitrogen oxides is reduced in comparison with the related art due to the transition from the lean phase to the rich phase.

The present invention will be described in greater detail in the following text on the basis of an exemplary embodiment shown in the figures.

DETAILED DESCRIPTION

Figure 1:
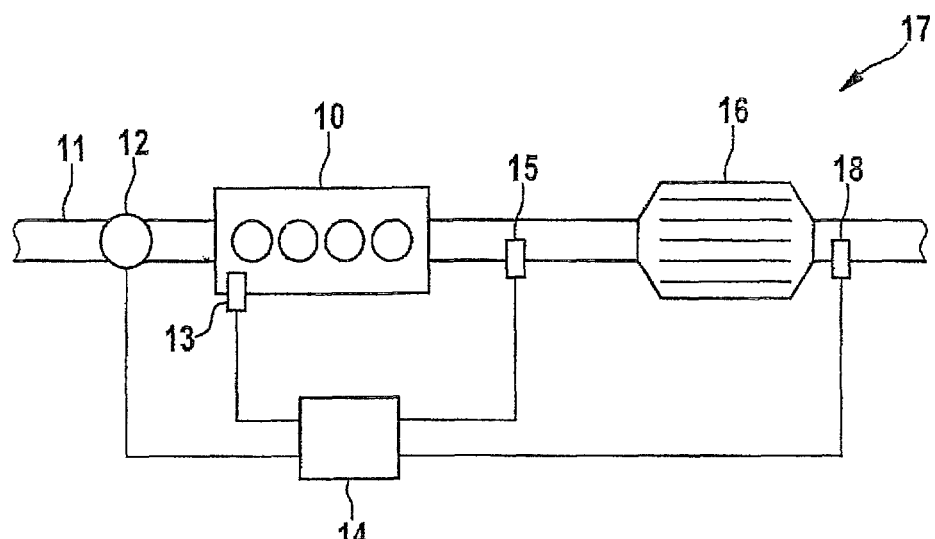
FIG. 1 shows a schematic illustration, the technical environment in which the method is able to be used.
Figure 2:
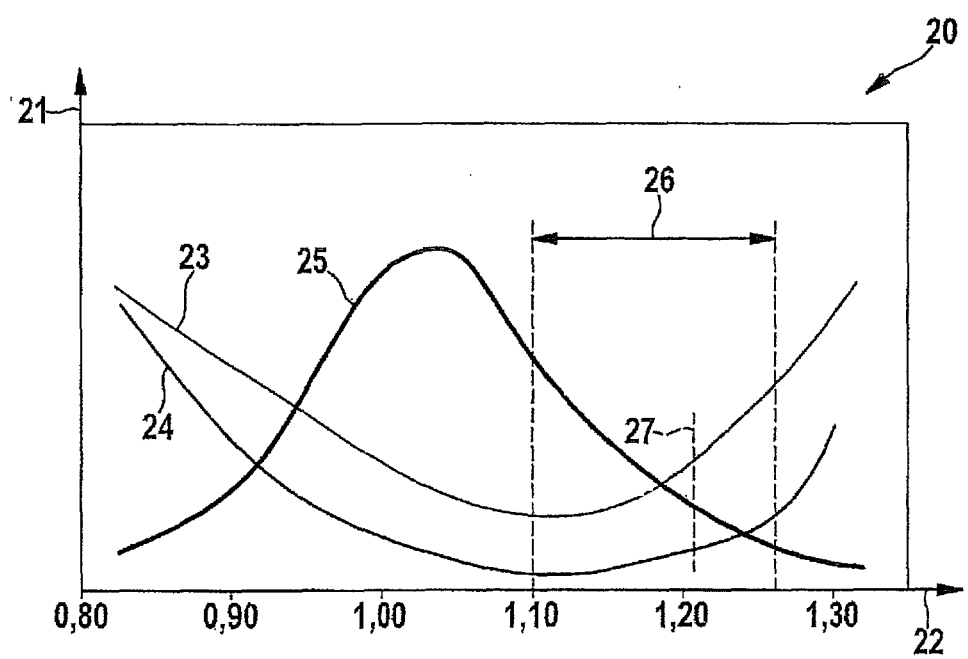
FIG. 2 shows a first diagram with relationships between a lambda value and emissions of an internal combustion engine.

FIG. 1 schematically illustrates the technical environment in which the method of the present invention may be used. An internal combustion engine 10, which is realized as gasoline engine having externally supplied ignition, is supplied with combustion air via an air supply 11. By way of example, the air quantity of combustion air is able to be ascertained with the aid of an mass air flow meter 12 in air supply 11. The supplied air quantity is used for ascertaining the fuel quantity to be added at a lambda value to be precontrolled or adjusted, for ascertaining exhaust gas parameters such as an exhaust gas quantity, a volumetric flow or an exhaust-gas rate. The exhaust gas of internal combustion engine 10 is discharged via an exhaust duct 17, in which a catalytic converter 16 is situated. Furthermore, a first lambda probe 15 upstream from catalytic converter 16 and a second lambda probe 18 downstream from catalytic converter 16 are disposed in exhaust tract 17, whose signals are forwarded to an engine control 14.

In one development variant, catalytic converter 16 may be implemented as pre-catalytic converter, and downstream from second lambda probe 18, a main catalytic converter (not shown here) may be installed in the exhaust gas system. In addition, further exhaust gas sensors such as NOx and/or HC sensors can be installed. Engine control 14 is moreover connected to mass air flow meter 12 and on the basis of the data it receives, ascertains a fuel quantity that is able to be supplied to internal combustion engine 10 via a fuel metering system 13. The exhaust gas of internal combustion engine 10 is cleaned of undesired components with the aid of catalytic converter 16 or a catalytic converter system made up of pre- and main catalytic converter, by catalytically converting these components into harmless substances. However, this functions adequately only if the internal temperature of the catalytic converters is sufficiently high, especially when using the pre-catalytic converter. In a start of internal combustion engine 10, it is therefore operated at a reduced efficiency in order to heat up the exhaust gas system, or internal combustion engine 10 is operated using a rich exhaust gas mixture and external air is additionally added upstream from catalytic converter 16, so that the hydrocarbons in the exhaust gas oxidize with oxygen from the air in the catalytic converter and thereby heat it up.

In a first diagram 20, Figure schematically illustrates the behavior of a raw emission of internal combustion engine 10 when the lambda value of the air-fuel mixture supplied to internal combustion engine 10 is varied. In diagram 20, a hydrocarbon emission 23, a carbon monoxide emission 24, and a nitrogen oxygen emission 25 have been plotted along a raw emission axis 21 and a first lambda axis 22. At a lambda value that rises starting with a value of 0.9, hydrocarbon emission 23 initially drops and then rises again up to a value of 1.3 starting with a lambda value of 1.1. Carbon monoxide emission 24 exhibits a similar behavior. Nitrogen oxide emission 25 rises up to approximately 1.05 starting with the lambda value of 0.9 and then drops when lambda values are higher than that. This results in a lambda range of approximately 1.05 to 1.25 in which the total emission is minimized. The exact characteristics of the hydrocarbon emission 23, carbon monoxide emission 24 and nitrogen oxide emission 25 depend on the combustion method of internal combustion 10; diagram 10 is intended merely to illustrate the basic relationships.

According to the present invention, after the start of internal combustion engine 10, it is therefore provided to first operate it at a lambda value in the range between approximately 1.05 and a lean misfire limit of the internal combustion engine, which may lie at a lambda value of 1.25 by way of example, in order to reduce the raw emissions or to heavily increase the exhaust gas heat flow at a limited increase of the raw emissions, in an effort to achieve the most rapid heating of catalytic converter 16 or the catalytic converter system possible.

Figure 3:
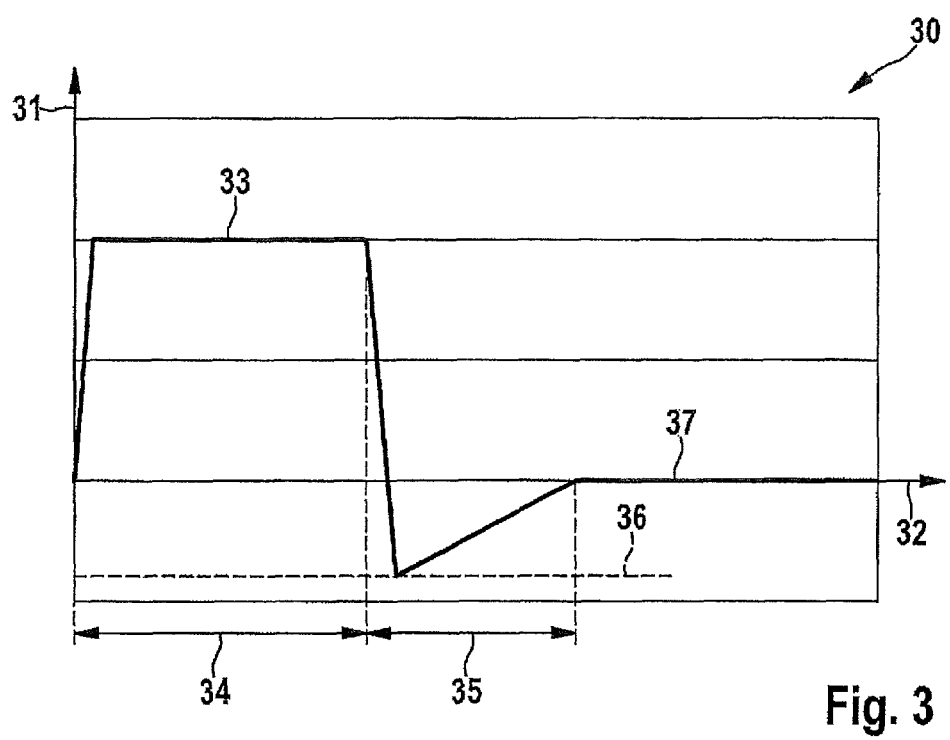
FIG. 3 shows a second diagram illustrating a lambda characteristic in a start of the internal combustion engine.

FIG. 3 illustrates in a second diagram 30 a lambda characteristic 33 during the start/catalytic converter heating phase of internal combustion engine 10. Lambda characteristic 33 is plotted along a second lambda axis 31 and a time axis 32. In a first phase 34 immediately after the start of internal combustion engine 10, a high lambda value is precontrolled or adjusted in order to reduce the raw emissions of internal combustion engine 10. With increasing time along time axis 32, catalytic converter 16 is heated up and, purely with regard to its thermal state, thus is able to convert the carbon monoxide, hydrocarbon and nitrogen oxide raw emissions of the engine. While this conversion starts at the existing lean air ratio for carbon monoxide and the hydrocarbons, a rapid lowering of the lambda value to 1 or below is required to convert the nitrogen oxide raw emission. As a result, a low lambda value is precontrolled or regulated in a second phase 35. To do so, the lambda value is abruptly controlled or regulated to an initial lambda value 36. With increasing time, lambda characteristic 33 is brought from initial lambda value 36 to a lambda target value 37 in second phase 35, given a catalytic converter 16 at operating temperature. This transition from initial lambda value 36 to lambda target value 37 may be implemented in the form of a ramp, for example.

What is claimed is:

1. A method for controlling a catalytic converter heating phase during startup of an internal combustion engine having an externally supplied ignition and at least one catalytic converter, which is in an exhaust tract of the internal combustion engine, the method comprising:
   upon starting up the internal combustion engine, and prior to achieving a sufficient temperature of the catalytic converter after startup for normal conversion of raw emissions by the catalytic converter, in a first phase of the catalytic converter heating phase, operating the internal combustion engine using a lean air-fuel mixture in a range between a lambda value of 1.05 and a lean misfire limit of the internal combustion engine that lies at a higher lambda value, and
   in a second phase of the catalytic converter heating phase following the first phase, initially operating the internal combustion engine using a rich air-fuel mixture with an initial value in a range between a lambda value of 0.95 and a lambda value of 0.995, and subsequently regulating the lambda value of the air-fuel mixture to a lambda target value equal to 1.0,
   wherein the first phase is ended and the second phase begun when a temperature of the catalytic converter is sufficiently high that conversion of hydrocarbons and nitrogen oxides is higher than a reduction potential of raw emissions when using a lean air-fuel mixture,
   wherein a duration of the first phase is ascertained in an engine control of the internal combustion engine from a behavior model of the internal combustion engine and a behavior model of the catalytic converter.

2. The method of claim 1, wherein the lambda value is abruptly varied from the lean range to the rich range between the first phase and the second phase.

3. The method of claim 1, wherein an exhaust-gas sensor is used for determining the ending of the first phase.

4. The method of claim 1, wherein at least one of the initial lambda value or the characteristic of the transition from the initial lambda value to the lambda target value in the second phase is ascertained and predefined via tests on an engine test stand using a pre-aged catalytic converter.

5. The method of claim 1, wherein a setpoint value of the lambda characteristic during the first phase is controlled by an engine control device via an evaluation of at least one of:

a combustion stability, an engine smooth running, or a variable of a combustion chamber pressure induction.

6. The method of claim 1, wherein, in the second phase, a lambda characteristic is brought from the initial value to the lambda target value in a ramp-type manner.

7. The method of claim 1, wherein at least one of the initial lambda value or the characteristic of the transition from the initial lambda value to the lambda target value in the second phase is ascertained in an engine control of the internal combustion engine based on the behavior model for the engine, which considers at least one of: raw emissions, the exhaust gas heat flow, or smooth running.

8. The method of claim 1, wherein at least one of the initial lambda value or the characteristic of the transition from the initial lambda value to the lambda target value in the second phase is ascertained from the behavior model of the catalytic converter, which describes at least one of: its light-off behavior, its oxygen storage capacity, or its pollutant conversion behavior.

9. A device for reducing pollutant emissions in an exhaust gas in a catalytic converter heating phase during startup of an internal combustion engine having an externally supplied ignition, the device comprising:
    an engine control for the internal combustion engine and at least one catalytic converter in an exhaust tract of the internal combustion engine, configured to operate the internal combustion engine in the catalytic converter heating phase during startup so that:
    upon starting up the internal combustion engine, and prior to achieving a sufficient temperature of the catalytic converter after startup for normal conversion of raw emissions by the catalytic converter, in a first phase of the catalytic converter heating phase, a lean air-fuel mixture is used, in a range between lambda=1.05 and a lean misfire limit of the internal combustion engine that lies at a higher lambda value, and
    in a second phase of the catalytic converter heating phase following the first phase, a rich air-fuel mixture is used, having an initial lambda value in a range between lambda=0.95 and lambda=0.995, and subsequently regulating to a lambda target value equal to 1.0,
    wherein the first phase is ended and the second phase begun when a temperature of the catalytic converter is sufficiently high that conversion of hydrocarbons and nitrogen oxides is higher than a reduction potential of raw emissions when using a lean air-fuel mixture,
    wherein a duration of the first phase is ascertained in an engine control of the internal combustion engine from a behavior model of the internal combustion engine and a behavior model of the catalytic converter.

10. The device of claim 9, wherein the lambda value is abruptly varied from the lean range to the rich range between the first phase and the second phase.

11. The device of claim 9, wherein, in the second phase, a lambda characteristic is brought from the initial value to the lambda target value in a ramp-type manner.

12. The device of claim 9, wherein a setpoint value of the lambda characteristic during the first phase is controlled by the engine control via an evaluation of at least one of: a combustion stability, an engine smooth running, or a variable of a combustion chamber pressure induction.

13. A method for controlling a catalytic converter heating phase during a startup of an internal combustion engine, the method comprising:
    upon starting up the internal combustion engine, and prior to achieving a sufficient temperature of the catalytic converter after startup for normal conversion of raw emissions by the catalytic converter, in a first phase of the catalytic converter heating phase, operating the internal combustion engine using a lean air-fuel mixture; and
    in a second phase of the catalytic converter heating phase following the first phase, initially operating the internal combustion engine using a rich air-fuel mixture with an initial lambda value and subsequently regulating a lambda value of the air-fuel mixture to a lambda target value equal to 1.0,
    wherein the first phase is ended and the second phase begun when a temperature of the catalytic converter is sufficiently high that conversion of hydrocarbons and nitrogen oxides is higher than a reduction potential of raw emissions when using a lean air-fuel mixture,
    wherein a duration of the first phase is ascertained in an engine control of the internal combustion engine from a behavior model of the internal combustion engine and a behavior model of the catalytic converter.

14. The method of claim 13, wherein, in the first phase, the lean air-fuel mixture is in a range between a lambda value of 1.05 and a lean misfire limit of the internal combustion engine that lies at a higher lambda value.

15. The method of claim 13, wherein, in the second phase, the initial lambda value is in a range between a lambda value of 0.95 and a lambda value of 0.995.

* * * * *